US008260344B2

(12) United States Patent
Ashida et al.

(10) Patent No.: US 8,260,344 B2
(45) Date of Patent: Sep. 4, 2012

(54) ELECTRONIC DEVICE AND CONTROL PROGRAM THEREOF

(75) Inventors: Takeshi Ashida, Kawasaki (JP); Atsuo Soma, Hitachinaka (JP); Satoshi Sato, Tokyo (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 538 days.

(21) Appl. No.: 12/510,194

(22) Filed: Jul. 27, 2009

(65) Prior Publication Data

US 2010/0056208 A1 Mar. 4, 2010

(30) Foreign Application Priority Data

Sep. 4, 2008 (JP) .................................. 2008-226647
Apr. 2, 2009 (JP) .................................. 2009-089979

(51) Int. Cl.
*H04M 1/00* (2006.01)
*G01C 22/00* (2006.01)
*G06F 11/30* (2006.01)

(52) U.S. Cl. ................. 455/550.1; 455/90.1; 455/556.1; 455/899; 702/160; 702/185

(58) Field of Classification Search ................. 455/90.1, 455/414.1, 418, 567, 550.1, 556.1; 702/141, 702/152, 160, 185, 189
See application file for complete search history.

(56) References Cited

U.S. PATENT DOCUMENTS

| 7,334,472 | B2* | 2/2008 | Seo et al. ................... 73/379.01 |
| 7,822,547 | B2* | 10/2010 | Lindroos ....................... 701/433 |
| 7,904,274 | B2* | 3/2011 | Shimaoka et al. ............ 702/160 |
| 2008/0140338 | A1* | 6/2008 | No et al. ........................ 702/141 |
| 2008/0190201 | A1* | 8/2008 | Makino ............................ 73/510 |
| 2008/0220824 | A1* | 9/2008 | Miyoshi et al. ............... 455/567 |
| 2009/0005220 | A1* | 1/2009 | Lee et al. .......................... 482/8 |
| 2009/0298536 | A1* | 12/2009 | Ikeda et al. ................ 455/556.1 |
| 2010/0024531 | A1* | 2/2010 | Senoo .......................... 73/65.01 |

FOREIGN PATENT DOCUMENTS

| JP | 2003-156361 | 5/2003 |
| JP | 2006-293860 | 10/2006 |

* cited by examiner

*Primary Examiner* — Duc M Nguyen
(74) *Attorney, Agent, or Firm* — Cozen O'Connor

(57) ABSTRACT

In a mobile phone device 1 including a three-axial direction vibration sensor 16 for detecting the walking of a user carrying the mobile phone device 1 and counting the number of walking steps, when an incoming call is received, vibrations due to a notification operation by a vibrator 14 or a speaker 15 are transmitted to the three-axial direction vibration sensor 16. As a result, the three-axial direction vibration sensor 16 inevitably detects unintended vibrations in addition to vibrations from walking, causing the number of walking steps to be miscounted. To prevent this and perform the accurate detection of walking, in the present invention, the detection of walking is performed without using, among vibrations in three directions detected by the three-axial direction vibration sensor 16, vibrations in the same direction as the direction of vibrations caused by a notification operation by the vibrator 14 or the speaker 15.

8 Claims, 8 Drawing Sheets

FIG. 7

| DETECTED MOVEMENT | MODE | EXECUTED PROCESS |
|---|---|---|
| TWO VIBRATIONS IN LEFT-RIGHT DIRECTION | MAIL VIEWING MODE | DISPLAY MAIN TEXT |
| TWO VIBRATIONS IN LEFT-RIGHT DIRECTION | ADDRESS BOOK MODE | TURN PAGE OF ADDRESS BOOK |
| .... | .... | .... |
| ONE VIBRATION IN LEFT-RIGHT DIRECTION | GAME MODE | START ATTACK |

ELECTRONIC DEVICE AND CONTROL PROGRAM THEREOF

CROSS-REFERENCE TO RELATED APPLICATION

This application is based upon and claims the benefit of priority from the prior Japanese Patent Application No. 2008-226647, filed Sep. 4, 2008, and No. 2009-089979, filed Apr. 2, 2009, the entire contents of which are incorporated herein by reference.

BACKGROUND OF THE INVENTION

1. Field of the Invention

The present invention relates to an electronic device that performs predetermined processing based on vibrations, and a control program thereof.

2. Description of the Related Art

Conventionally, in response to user's health consciousness, an electronic device such as a mobile phone providing an electronic pedometer function in addition to its original mobile phone communication function has been devised. This electronic pedometer function controls a vibration sensor provided within the electronic device to detect the walking of a user, and counts the number of walking steps. The counted number of walking steps is displayed in the display section.

Also, there has been devised a technique in which a three-axial acceleration sensor is used as a vibration sensor for an electronic pedometer function such as described above, and the number of walking steps is accurately counted based on a composite value of acceleration values in three axial directions (refer to, for example, Japanese Patent Application Laid-Open (Kokai) Publication No. 2006-293860).

However, when the user is on a vehicle such as a train, the vibration sensor detects even vibrations caused by the movement of the train, and miscounts the number of walking steps. For this reason, a technique has been devised in which, if the user is on a vehicle such as a train, the number of walking steps is not counted even when a vibration is detected, and only the number of walking steps resulting from the walking of the user is counted (refer to, for example, Japanese Patent Application Laid-Open (Kokai) Publication No. 2003-156361).

Also, in an electronic device such as the mobile phone, when an incoming call, etc. is received, this is signaled by an alarm sound from the speaker or by vibration of the electronic device by the vibrator therein. Therefore, there is a problem that, when the above-described alarm sound or vibration of the electronic device starts while the number of walking steps is being counted, the three-axial acceleration sensor detects this alarm sound or vibration of the electronic device, and as a result, the counting of the number of walking steps is not accurately performed and the number of walking steps is miscounted.

In such a case, as described in the above Japanese Patent Application Laid-Open (Kokai) Publication No. 2003-156361 for example, a technique in which the number of walking steps is not counted while an incoming call is being signaled may be applicable. However, when an incoming call is signaled while the user is walking, the number of walking steps taken during this time is not counted, and as a result, an accurate number of walking steps is not counted. Therefore, this technique does not solve the above-described problem.

Moreover, the three-axial acceleration sensor is used not only as a pedometer but also, for example, as a so-called motion sensor that detects the movement (motion) of the electronic device itself and initiates a predetermined operation. In this case also, there is a possibility that the motion is erroneously detected when an incoming call, etc. is signaled by an alarm sound or vibration of the electronic device.

Furthermore, this alarm sound or vibration of the electronic device is generated not only when an incoming call is signaled by its phone function but also, for example, at an alarm time set in advance, when a set time of the timer is up, or when a game installed thereon is being played. Therefore, there is a problem that, in such cases, the three-axial acceleration sensor malfunctions and its original function (such as a function for detecting the walking of the user by the vibration sensor and counting the number of walking steps) is not provided.

SUMMARY OF THE INVENTION

The present invention has been conceived to solve the foregoing problems, and is to provide an electronic device capable of preventing a malfunction in detecting vibrations so as to perform predetermined processing, which occurs when intended vibrations are not accurately detected due to unintended vibrations caused by another factor being generated in addition to the intended vibrations which should be detected.

In order to achieve the above-described purpose, in accordance with one aspect of the present invention, there is provided an electronic device including a vibration detecting means for detecting vibrations in each of a plurality of directions, and a function processing means for performing processing of a predetermined function based on vibrations detected by the vibration detecting means, comprising: a vibration generating means for generating a vibration by sound output or a vibration for notification; a vibration judging means for judging whether or not a vibration is or has been generated by the vibration generating means; and a function controlling means for, when judged by the vibration judging means that a vibration is or has been generated, controlling the function processing means while eliminating vibrations in a direction that matches a direction of the vibration generated by the vibration generating means.

In accordance with another aspect of the present invention, there is provided a computer-readable storage medium having stored thereon a program that is executable by a computer, comprising: vibration detection processing which detects vibrations in each of a plurality of directions; function execution processing which executes processing of a predetermined function based on vibrations detected by the vibration detection processing; vibration generation processing which generates a vibration by sound output or a vibration for notification; vibration judgment processing which judges whether or not a vibration is or has been generated by the vibration generation processing; and function control processing which controls, when judged by the vibration judgment processing that a vibration is or has been generated, the function execution processing while eliminating vibrations in a direction that matches a direction of the vibration generated by the vibration generation processing.

According to the present invention, in predetermined processing based on vibrations, the correct processing are performed through the elimination of unintended vibrations caused by another factor.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 7 is a detailed schematic diagram of the application information storage section 12 in FIG. 1.

DETAILED DESCRIPTION OF THE PREFERRED EMBODIMENTS

The present invention will hereinafter be described in detail with reference to the preferred embodiments shown in the accompanying drawings.

First Embodiment

Figure 1:
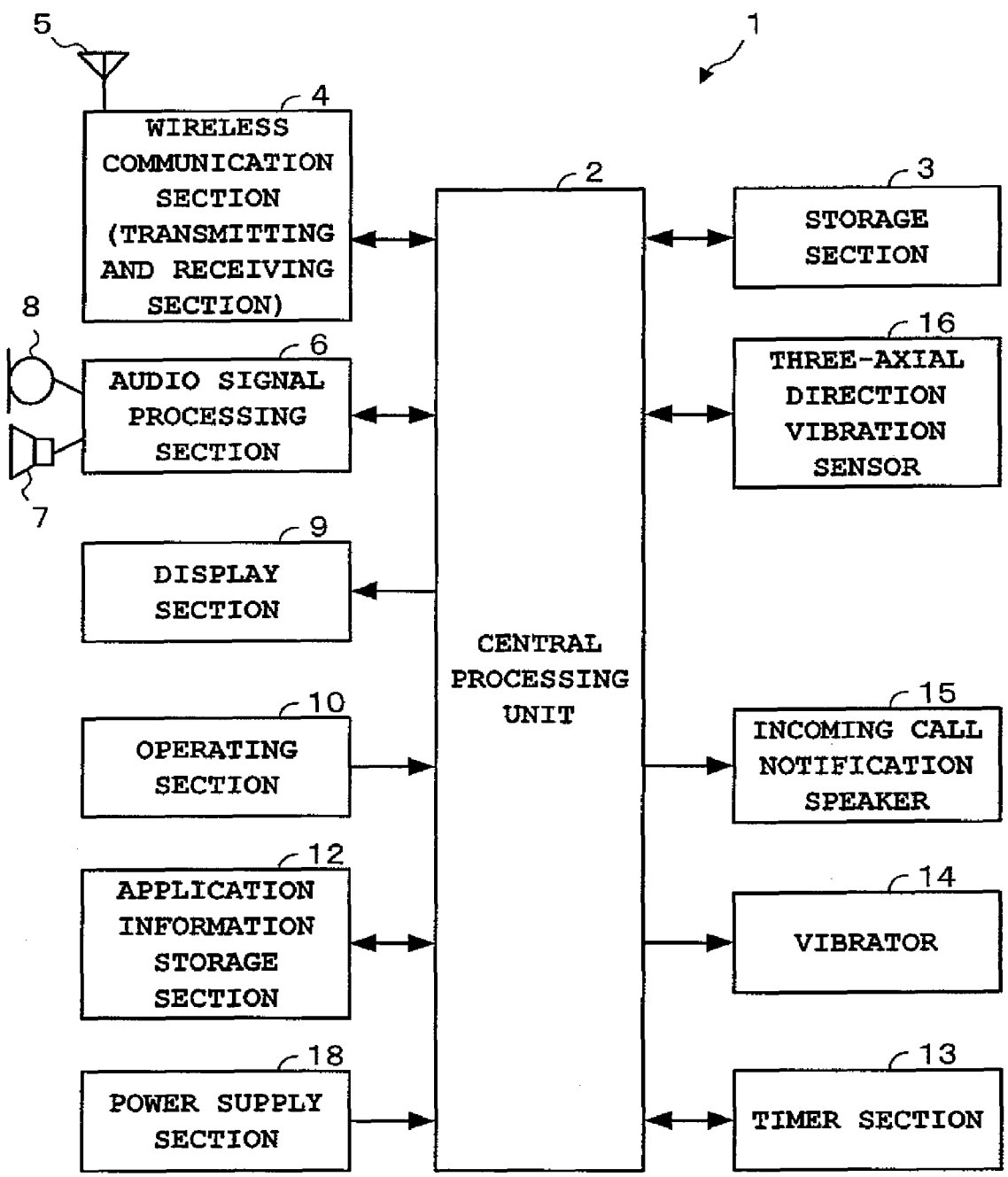
FIG. 1 is a circuit block diagram of a configuration of a mobile phone device 1 according to the present invention.

FIG. 1 is a circuit block diagram of a mobile phone device 1 that is an example of an electronic device according to the present invention.

In FIG. 1, a central processing unit (CPU) 2 controls the overall operation of the mobile phone device 1 based on various programs stored in a storage section 3. That is, the storage section 3 includes a read-only memory (ROM; not shown) storing programs for executing processing in the flowcharts shown in FIG. 4 to FIG. 6 described hereafter and application programs for executing various applications, and based on the programs stored in the ROM, the CPU 2 controls the overall operation of the mobile phone device.

When a communication function of the telephone is running, a wireless communication section 4 (transmitting and receiving section) (communication means) demodulates wireless audio signals picked up by an antenna 5 into reception baseband signals, and then output the reception baseband signals as audio from a reception speaker 7 via an audio signal processing section 6. Audio signals inputted from a transmitter microphone 8 are processed by the audio signal processing section 6, and the processed audio signals are sent to the wireless communication section 4. Then, in the wireless communication section 4, the audio signals are encoded into transmission baseband signals, and the encoded signals are outputted to be transmitted from the antenna 5.

When, for example, an electronic mail function or an internet connection function is running, transmission and reception of electronic mail or access to websites is possible via the antenna 5 and the wireless communication section 4, and electronic mail transmission and reception information and website access information are sent to a display section 9 and outputted to be displayed.

The display section 9 includes, for example, a dot-matrix type liquid crystal display device or an electroluminescent (EL) display device, and displays information (such as a telephone number of a communication partner, a radio wave reception condition, and remaining battery power) required for operation as a phone device, as well as contents of electronic mail and websites described above. Moreover, when a pedometer function is running, the display section 9 displays the number of counted walking steps as will be described hereafter.

An operating section 10 includes operation keys provided on the mobile phone device 1. Although details are not shown, the operation keys include a power ON/OFF key, number and text input keys for entering numerical information and text information, various application keys for selecting the activation and the termination of various functions (applications) (including a pedometer key for instructing the activation and the termination of the pedometer function), a manner mode key for setting the mobile phone device 1 to signal an incoming call by vibration of the vibrator described hereafter instead of an alarm sound that is ordinarily used for signaling, an on-hook key and an off-hook key for calls, etc.

Figure 2:
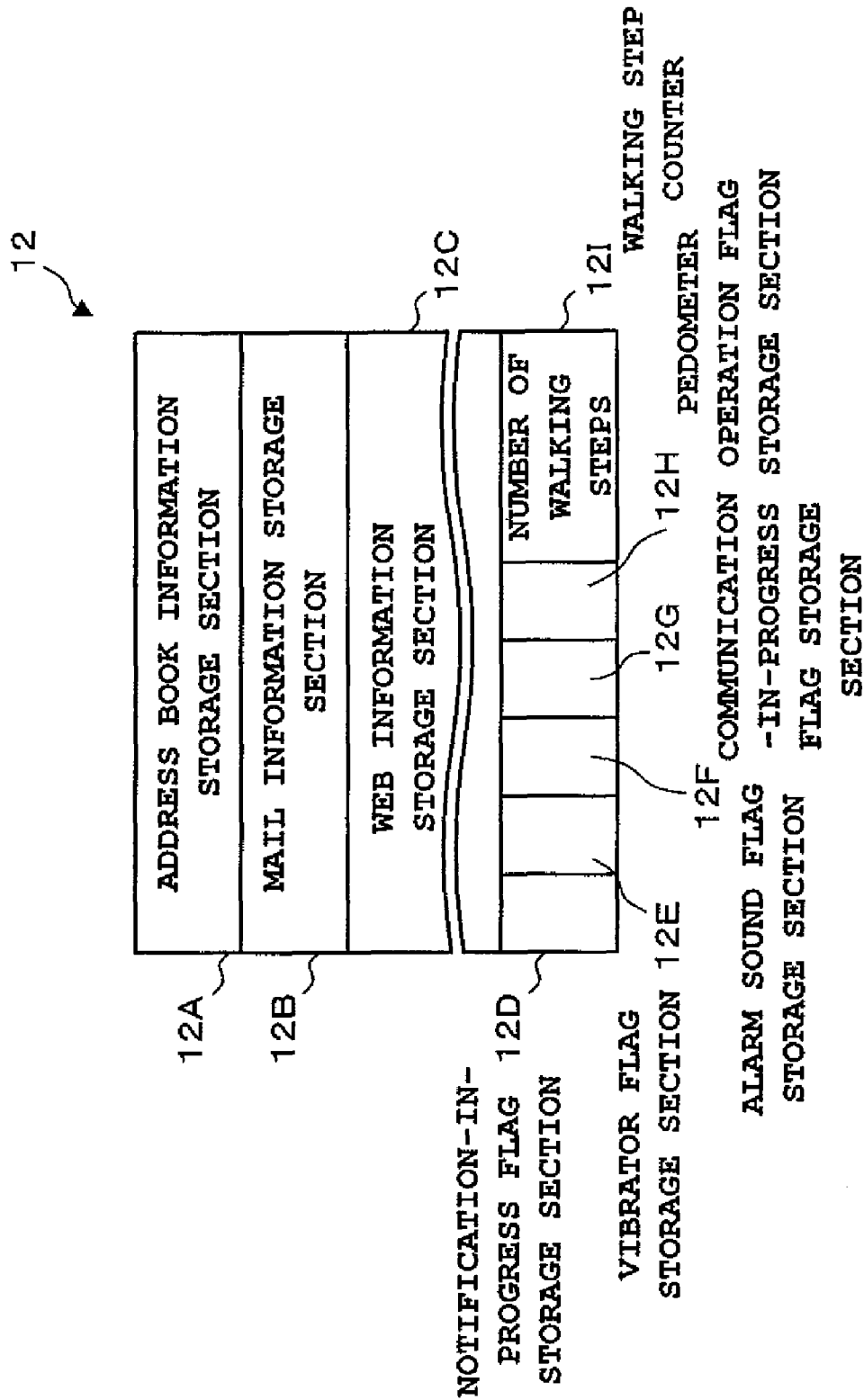
FIG. 2 is a detailed schematic diagram of an application information storage section 12 in FIG. 1.

An application information storage section 12 is a section for storing information related to various applications which includes, for example, storage areas such as an address book information storage section 12A, a mail information storage section 12B, and a web information storage section 12C as shown in FIG. 2. The address book information storage section 12A stores address information (names, addresses, phone numbers, etc.) for an address book function, the mail information storage section 12B stores transmitted and received mail information for the mail function, and the web information storage section 12C stores website URL information and the like for the internet function.

The application information storage section 12 also stores information used to control each application. Therefore, as shown in FIG. 2, a notification-in-progress flag storage section 12D, a vibrator flag storage section 12E, an alarm sound flag storage section 12F, an a communication-in-progress flag storage section 12G are also included in the application information storage section 12. The notification-in-progress flag storage section 12D is ordinarily set to "0". However, flag information "1" is set therein for the process of signaling a received incoming call to the user. The vibrator flag storage section 12E is set to "1" for the process of signaling an incoming call by vibration of the vibrator. The audible alert flag storage section 12F is set to "1" for the process of signaling an incoming call by a notification speaker. The communication-in-progress flag storage section 12G is set to "1" when the off-hook key is operated to enter a state where communication with an incoming caller is possible, while the incoming call is being signaled.

The application information storage section 12 also includes a pedometer operation flag storage section 12H and a walking step counter 12I as storage sections related to the pedometer. The pedometer operation flag storage section 12H is set to "1" when the pedometer function is running. The walking step counter 12I counts the number of walking steps.

Returning to FIG. 1, a timer section 13 includes a clock circuit section (not shown), an alarm time circuit section (not shown), etc. The clock circuit section obtains current time and date information, such as a current year, date, day of the week, and time by counting reference signals. The alarm time circuit section gives notification by an alarm sound or the like that an alarm time set in advance is reached when current time information matches alarm time information.

Figure 3:
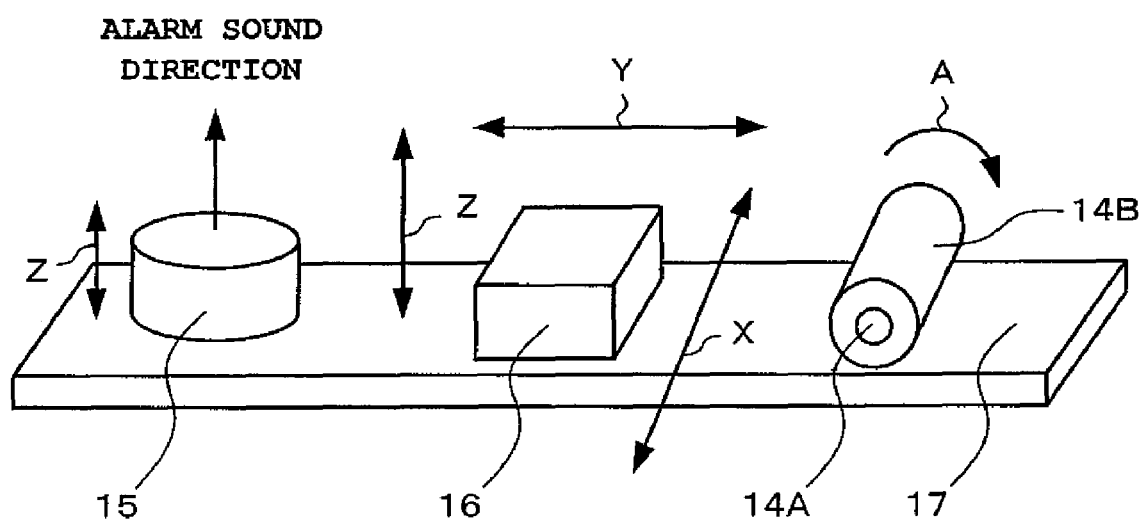
FIG. 3 is a diagram of a positional relationship among a vibrator 14, an incoming call notification speaker 15, and a three-axial direction vibration sensor 16 in FIG. 1.

A vibrator 14 (vibration generating means, and incoming call signaling means) is a motor 14B in which, as shown in FIG. 3, a spindle (not shown) is attached to a rotation shaft 14A, and this vibrator 14 is attached to a circuit board 17 within a device case (not shown) of the mobile phone device 1. The vibrator 14 vibrates the device case of the mobile phone device 1 by the rotation of the motor 14b via the circuit board 17.

The incoming call notification speaker 15 in FIG. 1 is used to signal an incoming call to the user by a loud alarm sound. However, the incoming call notification speaker 15 is used not only when incoming calls are received but also when a music playback function is running to play music at a loud volume. This incoming call notification speaker 15 is also attached to the circuit board 17 as shown in FIG. 3.

A three-axial direction vibration sensor 16 (vibration detecting means) in FIG. 1 includes an acceleration sensor that uses acceleration in an X-axial (longitudinal) direction, a Y-axial (lateral) direction, and a Z-axial (vertical) direction to obtain information on a magnitude of vibration of the mobile phone device 1 in each direction, and detects the walking of the user carrying the mobile phone device 1. This three-axial direction vibration sensor 16 is provided on the circuit board 17 between and near the motor 14b and the incoming call notification speaker 15, as shown in FIG. 3. In other words, as shown in FIG. 3, the three-axial direction vibration sensor 16 is provided at a position where, when a vibration is generated by the rotation of the rotation shaft 14A of the vibrator 14 (motor 14B) in an arrow A direction, the vibration is transmitted to via the circuit board 17.

Therefore, the three-axial direction vibration sensor 16 inevitably detects, since the circuit board 17 in this instance vibrates in an arrow Y-axial direction (lateral direction) and an arrow Z-axial direction (vertical direction) by the rotation of the vibrator 14 (motor 14B), the vibrations in the Y-axial (lateral) direction and the Z-axial (vertical) direction generated by the vibrator 14 (motor 14B).

On the other hand, the incoming call notification speaker 15 attached to the circuit board 17 is also provided at a position where an alarm sound vibration emitted therefrom is transmitted to the three-axial direction vibration sensor 16. Therefore, in this configuration, when the notification speaker 15 emits an alarm sound, the vertical direction vibration of the alarm sound is transmitted to the three-axial direction vibration sensor 16, and the three-axial direction vibration sensor 16 inevitably detects the Z-axial (vertical) direction vibration emitted from the incoming call notification speaker 15.

Returning to FIG. 1, a power supply section 18 for providing a driving voltage to each circuit section described above includes a rechargeable secondary battery (not shown) and a backup battery for backing up each circuit section when the battery voltage of the secondary battery decreases.

Here, the CPU 2, the storage section 3, and the application information storage section 12 as a whole actualize functions of a function processing means, a vibration judging means, a function controlling means, a stop judging means, and a walking step detecting means.

Next, operations of the mobile phone device 1 configured as above will be described with reference to the flowcharts in FIG. 4 to FIG. 6. Each processing in the flowcharts is performed by the CPU 2.

Figure 4:
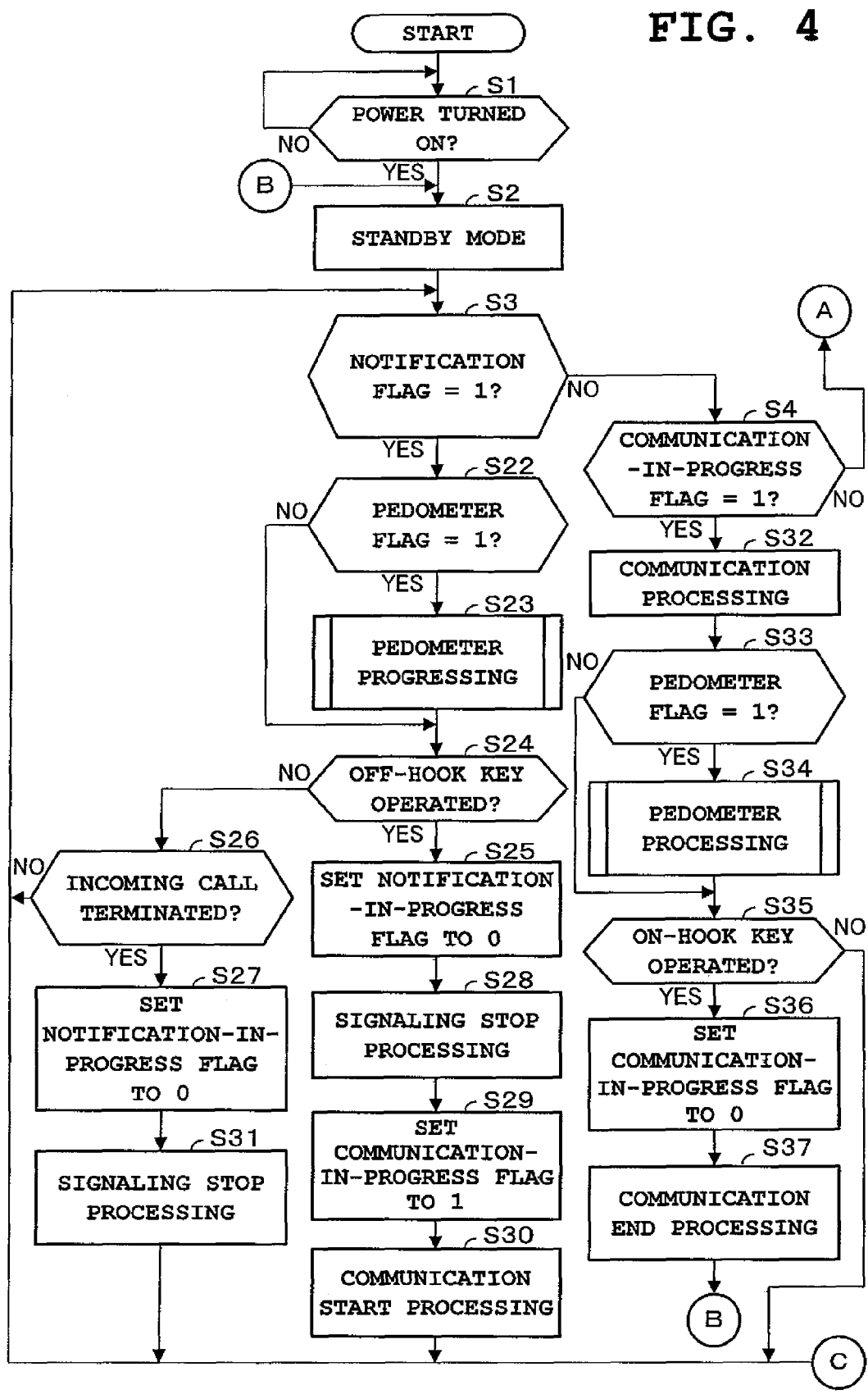
FIG. 4 is a flowchart of an overall operation performed by the mobile phone device 1 in FIG. 1.

In FIG. 4, at Step S1, the CPU 2 judges whether or not the power-ON key of the operating section 10 is operated in a power-OFF state. When the operation of the power-ON key is detected, the CPU 2 proceeds to Step S2, and performs standby processing to set the mobile phone device 1 to a state allowing reception of incoming calls.

When the standby processing is completed at Step S2, the CPU 2 proceeds to Step S3 and judges whether or not the notification flag in the notification flag storage section 12D in FIG. 2 has been set to "1".

At this point, the notification flag has not been set to "1". Therefore, the CPU 2 proceeds to Step S4 and judges whether or not the communication-in-progress flag in the communication-in-progress flag storage section 12G has been set to "1". At this point, the communication-in-progress flag has also not been set to 1. Therefore, the CPU 2 proceeds to Step S5 in FIG. 5 and judges (detects) whether or not an incoming call has been received.

When judged that an incoming call has been received, the CPU 2 proceeds to Step S6. When judged that an incoming call has not been received, the CPU 2 proceeds to Step S7 and judges whether or not the pedometer key in the operating section 10 has been operated. Note that a first key operation of the pedometer key initiates the pedometer (walking step count) function, and a second key operation terminates the pedometer function.

When judged at Step S7 that the pedometer key has been operated, the CPU 2 proceeds to Step S8 and judges whether or not the pedometer flag in the pedometer flag storage section 12H in FIG. 2 is "0".

Since the pedometer flag is a flag that is set to "1" when the pedometer function is running as described above, when the power is turned ON, the pedometer flag is "0". Accordingly, the CPU2 proceeds to Step S9 and sets the pedometer flag to "1". Then, at Step S10, the CPU 2 performs an initial setting for initiating the operation of the pedometer.

As a result, as will be described hereafter with reference to a flowchart, the number of walking steps is counted in the walking step counter storage section 12I in FIG. 2 based on a value of vibration (vibration amount) generated by the three-axial direction vibration sensor 16, and the counted value is displayed in the display section 9.

When judged that the pedometer flag is not "0" at Step S8, the CPU 2 judges that the pedometer key was operated in a state where the pedometer flag was already "1", that is, in a state where the pedometer was operating. Then, the CPU 2 proceeds to Step S11. At Step S11, the pedometer flag is set to "0", and processing to stop counting the number of walking steps is performed at subsequent Step S12.

When judged at Step S7 that the pedometer key has not been operated, the CPU 2 proceeds to Step S13 and judges whether or not any other key has been operated. This judgment of whether or not any other key has been operated at Step S13 refers to the detection of the operation of a key other than the power-ON key and the pedometer key described above, and the on-hook key and the off-hook key described hereafter. When the operation of a key other than these keys is detected, the CPU 2 proceeds to Step S14 and performs processing according to the detected key.

For example, when the power is turned ON, the mobile phone device 1 is set such that an incoming call is signaled by an alarm sound from the notification speaker 15. However, when the operation of the manner mode key is detected at Step S13, the CPU 2 performs processing for setting a manner mode flag (not shown) in the application information storage section 12 to "1" at Step S14. As a result, when an incoming call is received, the incoming call is signaled by the vibrator 14 as described hereafter.

In addition, the detection of telephone number input for telephone calls, data input into an address book, key input for texting when the mail function is running, etc. is also performed at Step S13, and processing according to the detected input is performed at Step S14.

When judged at Step S13 that no other key has been operated, the CPU 2 proceeds to Step S15 and judges whether or not the pedometer flag in the pedometer flag storage section 12H is "1". When judged that the pedometer flag is "1", the CPU 2 proceeds to Step S16 and performs pedometer processing. When judged that the pedometer flag is "0", the CPU 2 returns to the standby processing at Step S2 in FIG. 4.

That is, when judged at Step S7 that the pedometer key has been operated, and the pedometer flag is set to "1" at Step S9, the pedometer processing is subsequently performed at Step S16. Then, when the user starts walking, the number of walking steps is counted and displayed on the display section 9. Details of the pedometer processing at Step S16 will be described hereafter.

When judged at Step S5 that an incoming call has been received, the CPU 2 proceeds to Step S6 and the notification-in-progress flag in the notification-in-progress flag storage section 12D is set to "1". In addition, at subsequent Step S17, the CPU 2 judges whether or not manner mode has been set as the currently used notification mode. When judged that manner mode has been set as the currently used notification mode, the CPU 2 proceeds to Step S18 and sets the vibrator flag in the vibrator flag storage section 12E to "1". At subsequent Step S19, after initiating vibration processing by the vibrator 14, the CPU 2 returns to Step S3 in FIG. 4.

On the other hand, when judged at Step S17 that manner mode has not been set as the currently used notification mode, the CPU 2 sets the alarm sound flag in the alarm sound flag storage section 12F in FIG. 2 to "1". At subsequent Step S21, after controlling the incoming call notification speaker 15 to emit an alarm sound, the CPU 2 returns to Step S3 in FIG. 4.

That is, When judged at Step S5 that an incoming call has been received, the CPU 2 sets the notification-in-progress flag to "1", and according to the judgment of whether or not manner mode has been set as the currently used notification mode, initiates the signaling of the incoming call by either the vibrator 14 or the incoming call notification speaker 15. The CPU 2 then returns to Step S3 in FIG. 4.

Returning to Step S3 after the above process of receiving and signaling an incoming call, the CPU 2 judges that the notification-in-progress flag has been set to "1" and the incoming call has been signaled by either the vibrator 14 or the incoming call notification speaker 15. Accordingly, the CPU 2 proceeds to subsequent Step S22.

At Step S22, the CPU 2 judges whether or not the pedometer flag has been set to "1" or, in other words, judges whether or not the pedometer function is running. When judged that the pedometer function is running, the CPU 2 proceeds to Step S23. When judged that the pedometer function is not running, the CPU 2 proceeds directly to Step S24.

Figure 5:
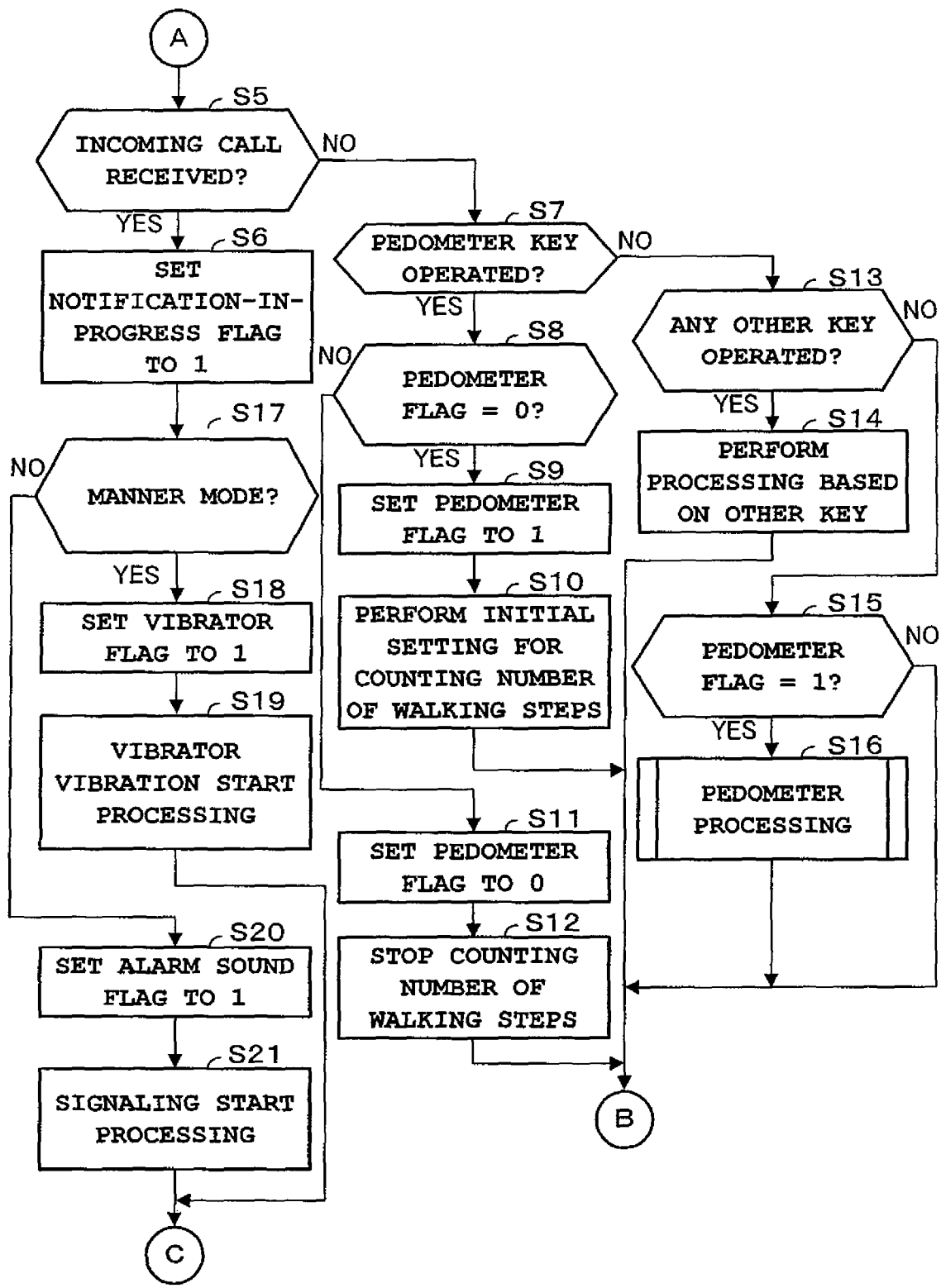
FIG. 5 is also a flowchart of the overall operation performed by the mobile phone device 1.

At Step S23, the same pedometer processing as that performed at Step S16 in FIG. 5 is performed. Although details of the pedometer processing will be described hereafter, in the pedometer processing, the number of walking steps is counted when the walking of the user is detected. When the walking of the user is not detected, the CPU 2 proceeds to the subsequent Step S24. At Step S24, the CPU 2 judges whether or not the off-hook key in the operating section 10 has been operated. When judged that the off-hook key has been operated, the CPU 2 performs processing of Step S25 and subsequent steps. When judged that the off-hook key has not been operated, the CPU 2 proceeds to Step S26 and judges whether or not processing for terminating an incoming call has been performed.

The processing for terminating an incoming call herein refers to, for example, the operation of an incoming call rejection key for rejecting an incoming call by the user, or the elapse of a predetermined amount of time since the reception of an incoming call. When judged that the incoming call rejection key has been operated or a predetermined amount of time has elapsed, the CPU 2 proceeds to Step S27. When judged that the incoming call rejection key has not been operated or a predetermined amount of time has not elapsed, the CPU 2 returns to Step S3 from Step S26.

That is, during the signaling of an incoming call, unless the CPU 2 judges that the off-hook key has been operated at Step S24 or that the processing for terminating an incoming call has been performed at Step S26, the processing at Step S3, Step S22, Step S23, Step S24, and Step S26 are repeatedly performed while the pedometer function is running. The number of walking steps taken during the signaling of this incoming call is detected and counted at Step S23.

When judged at Step S24 that the off-hook key has been operated, the CPU 2 sets the notification-in-progress flag to "0" at subsequent Step S25. Then, at subsequent Step S28, the CPU 2 performs processing that stops the signaling of an incoming call by the vibrator 14 or the incoming call notification speaker 15. Simultaneously, the vibrator flag and the alarm sound flag are also set to "0".

Subsequently, the CPU 2 proceeds to Step S29. At step S29, the CPU 2 sets the communication-in-progress flag in the communication-in-progress flag storage section 12G in FIG. 2 to "1", and after performing processing that enables the user to start communication with an incoming caller at Step S30, returns to Step S3.

On the other hand, when judged at Step S26 that the processing for terminating an incoming call has not been performed, the CPU 2 proceeds to Step S27, and after setting the notification-in-progress flag to 0 in the same manner as that at Step S25, proceeds to Step S31. At Step S31, the CPU 2 performs the processing that stops the signaling of an incoming call in the same manner as that at Step S28, and then returns to Step S3.

When judged at Step S24 that the off-hook key has been operated, the CPU 2 proceeds to Step S25 and subsequent steps, and when the communication-in-progress flag is set to "1" at Step S29 and communication with the incoming caller is started, the communication-in-progress flag will thereafter be judged to have been set to "1" at Step S4. Accordingly, the CPU 2 proceeds to Step S32 and performs communication processing. Then, at subsequent Step S33, The CPU 2 judges whether or not the pedometer flag has been set to "1" or, in other words, judges whether or not the pedometer function is running.

When judged that the pedometer function is not running, the CPU 2 proceeds to Step S35 and judges whether or not the on-hook key has been operated. When judged that the pedometer function is running, the CPU 2 proceeds to Step S34 from Step S33 and performs the pedometer processing for counting the number of walking steps when the waling of the user is detected. The CPU 2 then proceeds to Step S35.

That is, when an incoming call is received and communication with the incoming caller is started by the operation of the off-hook key, the processing at Step S3, Step S4, Step S32, Step S33, Step S34, and Step S35 are repeatedly performed until the CPU 2 judges at Step S35 that the on-hook key has been operated. Accordingly, even when the user is communicating with an incoming caller, if the user is walking, the walking of the user is detected and the number of steps is counted at Step S34.

When judged at Step S35 that the on-hook key has been operated, the CPU 2 sets the communication-in-progress flag back to "0" at Step S36, and after performing communication end processing at the subsequent Step S37, returns to the standby processing at Step S2.

Figure 6:
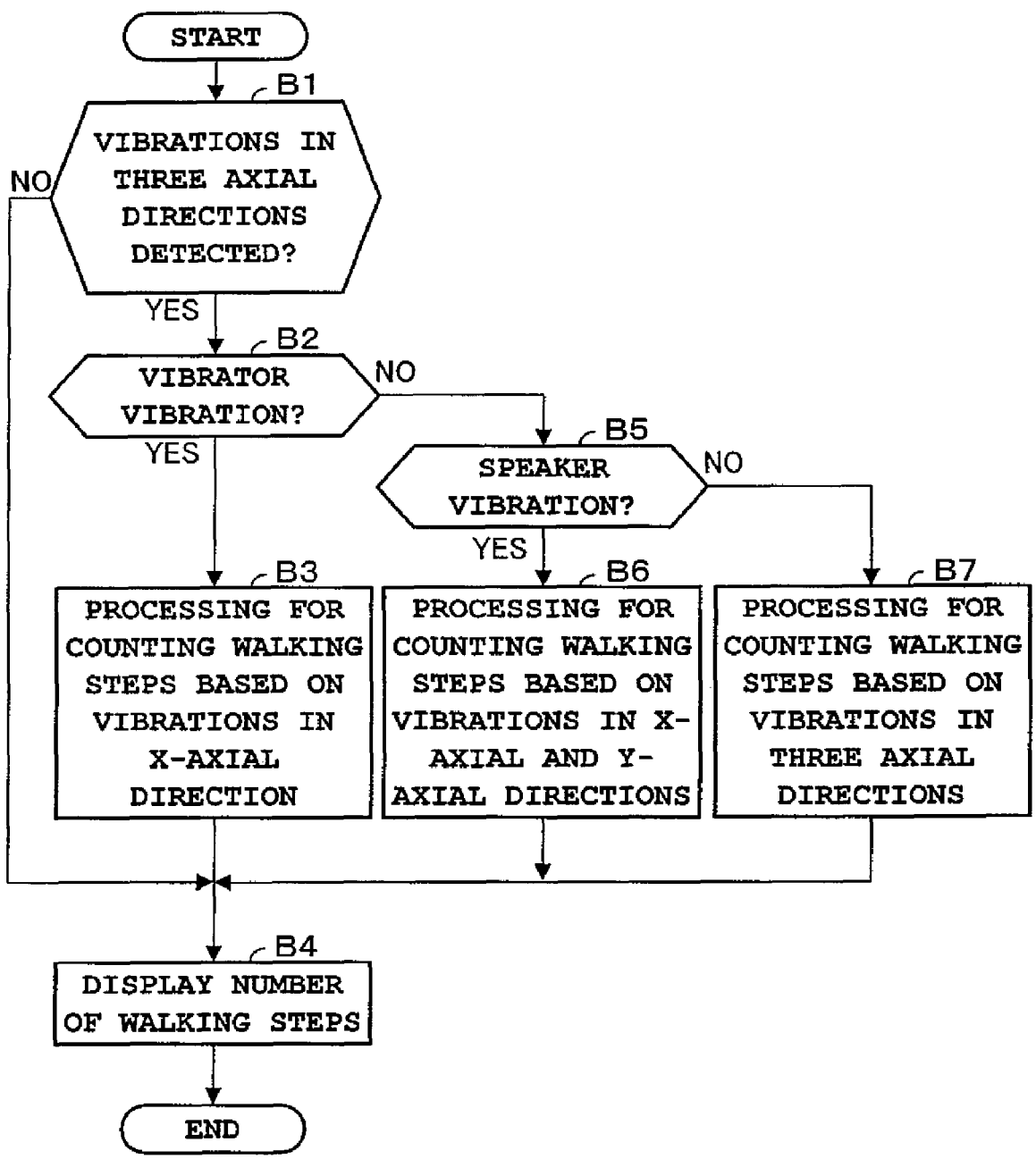
FIG. 6 is a detailed flowchart of pedometer processing in FIG. 4 and FIG. 5.

FIG. 6 shows details of the pedometer processing performed at Step S16, Step S23, and Step S34.

In FIG. 6, at first Step B1, the CPU 2 judges whether or not vibrations in the three axial directions have been detected by the three-axial direction vibration sensor 16, When judged that vibrations have been detected, the CPU 2 stores the vibration amount in a storage section (not shown) and proceeds to Step B2.

That is, when a vibration amount of a predetermined value is detected in all of the three directions, namely X-axial direction, Y-axial direction, and Z-axial direction of the three-axial direction vibration sensor 16, the CPU 2 stores each vibration amount in the storage section, and proceeds to Step B2 to judge whether or not the vibrator 14 is vibrating.

The judgment of whether or not the vibrator 14 is vibrating is performed by, for example, judging whether the vibrator flag in the vibrator flag storage section 12E in FIG. 2 has been set to "1". In this case, when judged that the vibrator flag has been set to "1", the CPU 2 proceeds to Step SB3. At Step B3, the CPU 2 judges whether or not the user is walking. This judgment is made based on the determination of whether or not the vibration amount of the X-axial direction exceeds a predetermined value. In this determination, only the vibration amount of the X-axial direction is used among the vibration amounts of the X-axial direction, Y-axial direction, and Z-axial direction stored in the storage section. When judged that the user is walking, the CPU 2 increments the value of the walking step counter 12I (+1).

Then, at subsequent Step B4, the CPU 2 displays in the display section 9 the value of the walking step counter 12I, namely the cumulative total value of walking steps taken since the initiation of the pedometer function operation.

When judged at Step B2 that the vibrator is not vibrating, the CPU 2 proceeds to Step B5 and judges whether or not the incoming call notification speaker 15 is being driven (is emitting an alarm sound). When judged that the incoming call notification speaker 15 is being driven (is emitting an alarm sound), the CPU 2 proceeds to Step B6 and judges, using only the vibration amounts of the X-axial direction and Y-axial direction, whether or not the user is walking. When judged that the user is walking, the CPU 2 increments the value of the walking step counter 12I.

When judged at Step B5 that the incoming call notification speaker 15 is not being driven (is not emitting an alarm sound), the CPU 2 proceeds to Step B7, and judges whether or not the user is walking based on the vibration amounts of the X-axial direction, Y-axial direction, and Z-axial direction. When judged that the user is walking, the CPU 2 increments the walking step counter 12I.

That is, in the pedometer processing at Step S23 in FIG. 4, since the incoming call is being signaled, the vibrator 14 or the incoming call notification speaker 15 is being driven. When the vibrator 14 is being driven, as described with reference to FIG. 3, the three-axial direction vibration sensor 16 inevitably detects vibrations in the Y-axial direction and Z-axial direction generated by the vibration of the vibrator 14. Accordingly, vibrations in the Y-axial direction and Z-axial direction vibrations generated by the walking of the user are not correctly detected. For this reason, when the vibrator 14 is being driven (YES at Step B2), the CPU 2 detects the walking of the user based only on the vibrations in the X-axial direction at Step B3.

When the incoming call notification speaker 15 is being driven, as described with reference to FIG. 3, the three-axial direction vibration sensor 16 inevitably detects vibrations in the Z-axial direction generated by the vibration of the incoming call notification speaker 15. Accordingly, vibrations in the Z-axial direction generated by the walking of the user is not detected. For this reason, when the incoming call notification speaker 15 is being driven (YES at Step B5), the CPU 2 detects the walking of the user based only on the vibrations in the X-axial direction and Y-axial direction at Step B6.

On the other hand, at Step S34 in FIG. 4 and Step S16 in FIG. 5, the driving of the vibrator 14 or the incoming call notification speaker 15 for signaling an incoming call is not being performed. Therefore, the CPU 2 always proceeds to Step B7 and detects the number of walking steps based on vibrations in the three axial directions, namely the X-axial direction, Y-axial direction, and Z-axial direction.

Even in the situation where the signaling of an incoming call is not being performed, when, for example, the current time reaches an alarm time and the alarm time is signaled by the vibrator 14 or the incoming call notification speaker 15 while the user is walking, vibrations generated by the walking of the user are not accurately detected. For this reason, the processing at Step B2, Step B3, Step B5, and Step B6 are performed also at Step S33 and Step S16 to correctly detect the walking of the user in the same manner as when the signaling of an incoming call is being performed.

According to the above-described embodiment, even when unintended vibrations caused by another factor such as the vibrator 14 or the incoming call notification speaker 15 signaling an incoming call are applied to the three-axial direction vibration sensors 16 which is detecting intended vibrations to count the number of walking steps, the number of walking steps is counted in such a manner to eliminate the unintended vibrations. Therefore, miscounting does not occur, and the counting accuracy of the pedometer is increased.

Second Embodiment

Next, a second embodiment of the present invention will be described.

A three-axial direction vibration sensor is also used in so-called motion control processing in which, when the user holds the electronic device itself in his hand and moves the electronic device in a predetermined direction, the three-axial direction vibration sensor detects the movement and performs predetermined processing.

According to the second embodiment of the present invention, malfunctions of the three-axial direction vibration sensor 16 caused by an alarm sound or the like in motion control processing such as this are prevented.

A circuit configuration according to the second embodiment is similar to that in FIG. 1. However, the configuration according to the second embodiment differs from that according to the first embodiment in that the operating section 10 includes a motion control key for turning the motion control function ON and OFF.

In addition, the application information storage section 12 includes a motion table 20 in which respective contents to be processed depending on the detected predetermined movements of the mobile phone device 1 itself are registered and stored.

In other words, as shown in FIG. 7, the motion table 20 includes a detected movement storage section 21, a mode storage section 22, and an executed process storage section 23. Information regarding the movement (motion) of the mobile phone device 1 itself is stored in the detected movement storage section 21.

The mode storage section 22 stores, for example, mode name information of a mode in which a motion movement is made. The executed process storage section 23 stores information on processing to be performed when a movement stored in the detected movement storage section 21 is detected and the mode at this point is that stored in the mode storage section 22.

For example, when the mobile phone device 1 is detected to have been shaken twice in the left-right direction as stored in the detected movement storage section 21 or, in other words, "two vibrations in left-right direction" is detected, and the mode at this point is a mail viewing mode stored in the mode storage section 22, processing to "display mail text" stored in the executed process storage section 23 is performed.

The application information storage section 12 also includes a vibration value storage section (not shown) for sequentially storing vibration values detected by the three-axial direction vibration sensor 16, and the movement of the mobile phone device 1 itself is determined based on vibration values sequentially stored in this vibration value storage section.

According to the second embodiment, the CPU 2, the storage section 3, and the application information storage section 12 as a whole actualize the functions of a motion controlling means.

Next, operations of motion control according to the second embodiment will be described with reference to the flow chart in FIG. 8. Each processing in this flowchart is also performed by the CPU 2.

Figure 8:
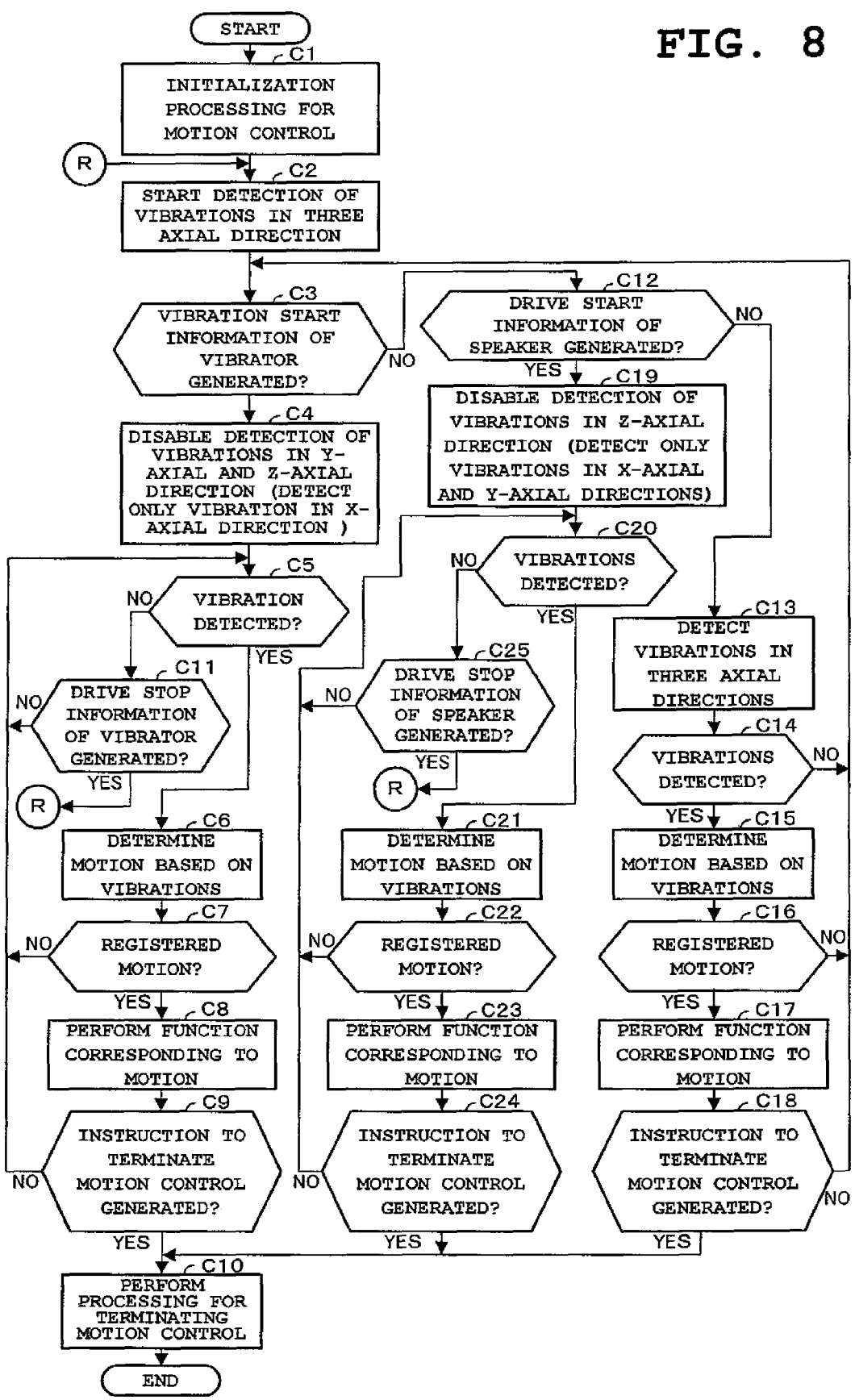
FIG. 8 is a flowchart according to the second embodiment of the present invention.

In FIG. 8, when the motion control key for turning ON the motion control function is operated, the CPU 2 performs initialization processing for motion control at Step C1. At subsequent Step C2, the three-axial direction vibration sensor 16 initiates the detection of vibration values in the three axial directions.

At subsequent Step C3, the CPU 2 judges whether or not vibration start information of the vibrator 14 has been generated.

Here, processing differing from those according to the first embodiment will be described.

According to the first embodiment described above, when an incoming call is received, the vibrator 14 or the incoming call notification speaker 15 is continuously driven. However, the signaling of an incoming call may be intermittently performed such that, for example, the vibrator 14 or the incoming call notification speaker 15 is driven for a second and stopped for the next second. In such case, each time they are being driven, that information is detected and the detection operation performed by the three-axial direction vibration sensor 16 is controlled. Therefore, a very complicated configuration is required. For this reason, according to the second embodiment, the CPU 2 judges whether or not the driving of the vibrator 14 or the incoming call notification speaker 15 is expected to be started. Thereafter, processing for controlling the detection operation of the three-axial direction vibration sensor 16 is performed regardless of the vibrator 14 or the incoming call notification speaker 15 being driven.

When judged at Step C3 that vibration start information of the vibrator 14 has been generated, the CPU 2 proceeds to Step C4. At Step C4, the CPU 2 sets a disabled (OFF) state in which vibrations in the Y-axial direction and Z-axial direction are not counted, and then performs processing for setting a state in which only a vibration value in the X-axial direction is countable (detectable).

At subsequent Step C5, the three-axial direction vibration sensor 16 detects a vibration value in the X-axial direction and the detected value is stored in the vibration value storage section. At subsequent Step C6, the CPU 2 determines the movement of the mobile phone device 1 itself based on vibration values stored in the vibration value storage section up to this point, and proceeds to Step C7. At Step C7, the CPU 2 judges whether or not the movement is a movement (motion) registered (stored) in the detected movement storage section 21 in the motion table 20.

At this point, the motion control function has just been initiated, and the number of vibration values in the vibration value storage section is small. Accordingly, the determination of the motion at Step C6 is impossible to perform, or the motion does not match a registered motion. Therefore, the CPU 2 returns to Step C5. Then, when the processing at Step C5 to Step C7 described above are repeatedly performed, and the number of vibration values stored in the vibration value storage section increases, the motion is determined. In addition, when the determined motion matches a registered motion, the CPU 2 proceeds to Step C8 from Step C7.

At Step C8, processing is performed in which a function corresponding to the matching motion is performed. That is, the CPU 2 judges whether or not the current mode matches a mode stored in the mode storage section 22 corresponding to the registered motion matching the motion table 20. When judged that the current mode is a mode stored in the mode storage section 22, the CPU 2 performs corresponding processing stored in the executed process storage section 23.

For example, when "two vibrations in left-right direction" is detected and the current mode is the "mail viewing mode" stored in the mode storage section 22, the CPU 2 performs the processing to "display main text" stored in the executed process storage section 23.

After performing the processing at Step C8, the CPU 2 proceeds to Step C9, and judges whether or not an instruction to terminate the motion control processing has been generated or, in other words, whether or not a key operation of the motion control key has been performed to turn OFF the motion control function. When judged that the key operation has been performed, the CPU 2 proceeds to Step C10 and performs processing for terminating the motion control function.

On the other hand, when judged at Step C9 that the key operation to turn OFF the motion control function has not been performed, the CPU 2 returns to Step C5 and continues the detection of a vibration using the three-axial direction vibration sensor 16.

Note that when a vibration is not detected at Step C5, the CPU 2 proceeds to Step C11 and judges whether or not drive stop information of the vibrator 14 has been generated. For example, after the signaling of an incoming call by the vibrator 14 is initiated, when the off-hook operation is performed while the motion control function is running, and the driving of the vibrator 14 is stopped thereby, the CPU 2 judges at Step C11 that the driving of the vibrator 14 has been stopped, and returns to Step C2 from Step C11.

At Step C2, the CPU 2 starts the detection of vibrations in the three axial directions again, and proceeds to Step C3. At this point, the driving of the vibrator 14 has already been completed, and therefore the CPU 2 proceeds to Step C12 from Step C3.

At Step C12, the CPU 2 judges whether or not drive start information of the incoming call notification speaker 15 has been generated. At this point, drive start information of the incoming call notification speaker 15 has not been generated. Therefore, the CPU 2 proceeds to Step C13, and performs processing for setting a state where the detection of vibration values in all three axial directions by the three-axial direction vibration sensor 16 is performable.

At subsequent Step C14, the CPU 2 judges whether or not vibrations have been detected by the three-axial direction vibration sensor 16, and after storing values of detected vibrations in the X-axial direction, Y-axial direction, and Z-axial direction in the vibration value storage section, proceeds to Step C15 to perform the determination of the motion.

The processing performed at subsequent Step C16 to Step C18 are the same as those at Step C7 to Step C9 described above. Therefore, detailed descriptions thereof are omitted. However, a brief description is given here. When the motion of the mobile phone device 1 matches a motion stored in the motion table 20, processing corresponding to this motion is performed.

When the judgment result of the judgment processing at Step C14, Step C16, or Step C18 is NO, the CPU 2 returns to Step C3 for detecting, in a case where the driving of the vibrator 14 or the incoming call notification speaker 15 is initiated during the detection of motion based on vibration values in all three axial directions obtained by the three-axial direction vibration sensor 16 at Step C13 to Step C18 described above, that the driving is initiated.

For example, in the situation where the signaling of an incoming calls has been set to be performed by an alarm sound, or in other words, in the situation where manner mode has not been set, when an incoming call is received while the processing at Step C13 to Step C18 described above are continuously performed, the CPU 2 detects speaker drive start information at Step C12 and proceeds to Step C19.

At Step C19, the CPU 2 disables (turn OFF) the detection of vibrations in the Z-axial direction by the three-axial direction vibration sensor 16, and performs processing for setting a state in which only vibration values in the X-axial and Y-axial directions are detectable.

At subsequent Step C20, the CPU 2 judges whether or not vibrations have been detected by the three-axial direction vibration sensor 16. When judged that vibrations have been detected, the CPU 2 stores the values of the detected vibrations in the X-axial and Y-axial directions in the vibration value storage section, and proceeds to Step C21 to determine the movement of the mobile phone device 1 itself.

The processing performed at subsequent Steps C22 to C24 are the same as those at Steps C7 to C9. Therefore, detailed descriptions thereof are omitted. However, a brief description is given here. When the motion of the mobile phone device 1 itself matches a motion stored in the motion table 20, processing corresponding to this motion is performed.

When judged at Step C20 that vibrations have not been detected, the CPU 2 proceeds to Step C25 and judges whether or not drive stop information of the incoming call notification speaker 15 has been generated. When judged that drive stop information has been generated, the CPU 2 returns to Step C2 in order to return to the detection of motion based on the detection of vibrations in the three axial direction performed at Step C13 to Step C18 when, after the signaling of an incoming call by the incoming call notification speaker 15 is initiated, the driving of the incoming call notification speaker 15 is stopped by the off-hook operation while the motion control function is running.

As described above, the second embodiment is an example in which, when the user moves the mobile phone device 1 in his hand in a predetermined direction, the motion (movement) is detected by the three-axial direction vibration sensor 16 and used for motion control for performing predetermined processing. In this embodiment also, the movement of the mobile phone device 1 is correctly detected through the elimination of vibrations generated by the vibrator 14 or the incoming call notification speaker 15 signaling an incoming call.

According to the above-described second embodiment, vibrations in, among the three axial directions of the three-axial direction vibration sensor 16, a direction that is affected by unintended factor are not detected, and thereby preventing the waste of power consumption. However, as in the case of the first embodiment, vibration amounts in a certain direction may be eliminated (not used) after vibration amounts in the three axial directions are measured and stored, and the motion may be detected based on vibration amounts in the remaining direction. Either method according to the first embodiment or the second embodiment is achievable by a very simple configuration.

According to the second embodiment, even in the situation where the detection of the motion based only on vibration amounts in a certain direction is being performed due to the signaling of an incoming call, when the signaling of the incoming call is stopped, the CPU 2 immediately detects at Step C11 or Step C25 that the signaling has been stopped. Accordingly, it is possible to resume the processing at Step C13 and subsequent steps which actualize highly accurate motion detection.

Note that, although the explanation has been given mainly on the case where the signaling of an incoming call by the phone function is performed, malfunction of a three-axial acceleration sensor used for detection, which occurs due to the detection of unintended vibrations caused by an alarm sound or the vibrator which are generated when, for example, an alarm time set in advance is reached, a set time of the timer is up, or a game installed thereon is being played, is also prevented in each embodiment described above.

In the above-described embodiments, the three-axial direction vibration sensor 16, the incoming call notification speaker 15, and the vibrator 14 are arranged on the same circuit board 17. However, these components are not required to be arranged on the same substrate. Even in the case where these components are arranged in different positions, the present invention is applicable as long as the vibrations of the incoming call notification speaker 15 or the vibrator 14 affects vibration detection performed by the three-axial direction vibration sensor 16.

It should be understood that, in such a case, the directions of vibrations to be eliminated from detected vibrations are accordingly determined corresponding to the arrangement states of the three-axial direction vibration sensor 16, the incoming call notification speaker 15, and the vibrator 14.

Lastly, in the individual embodiments described above, a case where the present invention is applied to the mobile phone device 1 is described. However, the present invention may be applied to any electronic device, such as a digital camera, a personal computer, a music player, and a personal digital assistant (PDA).

While the present invention has been described with reference to the preferred embodiments, it is intended that the invention be not limited by any of the details of the description therein but includes all the embodiments which fall within the scope of the appended claims.

What is claimed is:

1. An electronic device including a vibration detecting means for detecting vibrations in each of a plurality of directions, and a function processing means for performing processing of a predetermined function based on vibrations detected by the vibration detecting means, comprising:
   a vibration generating means for generating a vibration by sound output or a vibration for notification;
   a vibration judging means for judging whether or not a vibration is or has been generated by the vibration generating means; and a function controlling means for, when judged by the vibration judging means that a vibration is or has been generated, controlling the function processing means while eliminating vibrations in a direction that matches a direction of the vibration generated by the vibration generating means.

2. The electronic device according to claim 1, wherein the function controlling means eliminates vibrations in a direction that matches a direction of the vibration generated by the vibration generating means by eliminating detection results of, among vibrations in each direction detected by the vibration detecting means, vibrations in a direction that matches a direction of the vibration generated by the vibration generating means.

3. The electronic device according to claim 1, wherein the function controlling means eliminates vibrations in a direction that matches a direction of the vibration generated by the vibration generating means by stopping detection of, among vibrations in each direction detected by the vibration detecting means, vibrations in a direction that matches a direction of the vibration generated by the vibration generating means.

4. The electronic device according to claim 1, wherein:
the vibration judging means includes a stop judging means for judging whether or not the vibration generated by the vibration generating means stops or has stopped; and
the function controlling means resumes, when judged by the stop judging means that the vibration generated by the vibration generating means stops or has stopped, control of the function processing means using detection results of vibrations in the direction that matches the direction of the vibration generated by the vibration generating means.

5. The electronic device according to claim 1, wherein the function processing means is a walking step detecting means for detecting, based on vibrations in each direction detected by the vibration detecting means, the number of walking steps taken by a user carrying the electronic device.

6. The electronic device according to claim 1, wherein the function processing means is a motion controlling means for determining a motion of the electronic device moved by a user based on vibrations in each direction detected by the vibration detecting means and performing processing of a predetermined function corresponding to the motion of the electronic device.

7. The electronic device according to claim 1, further comprising:
a communicating means for performing communication; and
an incoming call signaling means for signaling an incoming call made to the communicating means;
wherein a vibration generated by the vibration generating means is a vibration generated by the incoming call signaling means.

8. A non-transitory computer-readable storage medium having stored thereon a program that is executable by a computer, comprising:
vibration detection processing which detects vibrations in each of a plurality of directions;
function execution processing which executes processing of a predetermined function based on vibrations detected by the vibration detection processing;
vibration generation processing which generates a vibration by sound output or a vibration for notification;
vibration judgment processing which judges whether or not a vibration is or has been generated by the vibration generation processing; and
function control processing which controls, when judged by the vibration judgment processing that a vibration is or has been generated, the function execution processing while eliminating vibrations in a direction that matches a direction of the vibration generated by the vibration generation processing.

* * * * *